United States Patent [19]

Mrazek et al.

[11] 4,367,159
[45] Jan. 4, 1983

[54] METHOD FOR UNIFORMLY DISTRIBUTING CARBON FLAKES IN A POSITIVE ELECTRODE, THE ELECTRODE MADE THEREBY AND COMPOSITIONS

[75] Inventors: Franklin C. Mrazek, Hickory Hills; John A. Smaga, Lemont; James E. Battles, Oak Forest, all of Ill.

[73] Assignee: The United States of America as represented by the United States Department of Energy, Washington, D.C.

[21] Appl. No.: 206,234

[22] Filed: Jan. 19, 1981

[51] Int. Cl.$^3$ .................. H01M 4/52; H01M 6/18
[52] U.S. Cl. .................. 252/182.1; 429/104; 429/199; 429/221; 75/229
[58] Field of Search .................. 252/182.1; 429/100, 429/199, 221

[56] References Cited

U.S. PATENT DOCUMENTS

| | | | |
|---|---|---|---|
| 3,907,589 | 9/1975 | Gay et al. | 429/221 |
| 3,933,520 | 1/1976 | Gay et al. | 429/221 |
| 3,933,521 | 1/1976 | Vissers et al. | 429/221 |
| 3,941,612 | 3/1976 | Steunenberg et al. | 429/221 |
| 3,947,291 | 3/1976 | Yao et al. | 429/221 |
| 4,006,634 | 2/1977 | Shimotake et al. | 429/221 |
| 4,011,373 | 3/1977 | Kaun et al. | 429/221 |
| 4,011,374 | 3/1977 | Kaun et al. | 429/221 |
| 4,086,404 | 4/1978 | Vissers et al. | 429/221 |
| 4,158,720 | 6/1979 | Kaun | 429/221 |

OTHER PUBLICATIONS

Kaun et al., The Electrochemical Soc., Abstract, No. 39, Oct., 1977.
Borger et al., The Electrochemical Soc., Abstract, No. 46, Oct., 1977.

*Primary Examiner*—Irwin Gluck

[57] ABSTRACT

A positive electrode for a secondary electrochemical cell wherein an electrically conductive current collector is in electrical contact with a particulate mixture of gray cast iron and an alkali metal sulfide and an electrolyte including alkali metal halides or alkaline earth metal halides. Also present may be a transition metal sulfide and graphite flakes from the conversion of gray cast iron to iron sulfide. Also disclosed is a method of distributing carbon flakes in a cell wherein there is formed an electrochemical cell of a positive electrode structure of the type described and a suitable electrolyte and a second electrode containing a material capable of alloying with alkali metal ions. The cell is connected to a source of electrical potential to electrochemically convert gray cast iron to an iron sulfide and uniformly to distribute carbon flakes formerly in the gray cast iron throughout the positive electrode while forming an alkali metal alloy in the negative electrode. Also disclosed are compositions useful in preparing positive electrodes.

40 Claims, No Drawings

METHOD FOR UNIFORMLY DISTRIBUTING CARBON FLAKES IN A POSITIVE ELECTRODE, THE ELECTRODE MADE THEREBY AND COMPOSITIONS

CONTRACTURAL ORIGIN OF THE INVENTION

The invention described was made in the course of, or under, a contract with the U.S. Department of Energy.

BACKGROUND OF THE INVENTION

This invention relates to a high-temperature secondary electrochemical cell and batteries of such cells that can be employed as power sources for electric automobiles, storage of energy generated during intervals of off-peak power consumption and various other applications.

A substantial amount of work has been done in the development of such electrochemical cells and their electrodes. The cells showing the most promise employ alkali metals, alkaline earth metals and alloys of these materials as negative electrodes opposed to positive electrodes including the chalcogens and metal chalcogenides as active materials. Typical examples include lithium, sodium or calcium and alloys of these active materials with more stable elements such as aluminum or boron as the negative electrode materials. In the positive electrode, active materials advantageously include metal sulfides or mixtures of transition metal sulfides such as the iron sulfide, cobalt sulfide, copper sulfide, nickel sulfide, cesium sulfide and molybdenum sulfide.

Examples of such secondary cells and their components are disclosed in U.S. Pat. No. 3,907,589 to Gay et al., entitled "Cathodes for a Secondary Electrochemical Cell" and in U.S. Pat. No. 3,947,291 issued Mar. 30, 1976 to Yao et al., entitled "Electrochemical Cell Assembled in Discharged State", U.S. Pat. No. 3,933,521 issued Jan. 20, 1976 to Vissers et al., entitled "Improved Anode for a Secondary High-Temperature Electrochemical Cell", U.S. Pat. No. 3,941,612 issued Mar. 2, 1976 to Steunenberg et al., entitled "Improved Cathode Composition for Electrochemical Cell", U.S. Pat. No. 3,933,520 issued Jan. 20, 1976 to Gay et al., entitled "Method of Preparing Electrodes with Porous Current Collector Structures and Solid Reactants for Secondary Electrochemical Cells", U.S. Pat. No. 4,006,034 issued Feb. 1, 1977 to Shimotake et al., entitled "Method of Preparing an Electrochemical Cell in Uncharged State", U.S. Pat. No. 4,011,373 issued Mar. 8, 1977 to Kaun et al., entitled "Uncharged Positive Electrode Composition", and U.S. Pat. No. 4,011,374 issued Mar. 8, 1977 to Kaun entitled "Porous Carbonaceous Electrode Structure and Method For Secondary Electrochemical Cell". Each of these patents is assigned to the assignee of the present application.

It has been previously been recognized that the addition of electrically conductive fillers incorporated into the positive electrode is advantageous. Electrically conductive metal powders of iron, cobalt, nickel, tungsten, molybdenum, niobium and powders of various other electrically conductive metals or carbon can be blended into the positive electroactive material. Usually, this electroactive material is formulated into a paste in which the transition metal chalcogenides as well as the selected halide and other additives are held together with a binder, the binder being either a suitable synthetic organic resin or a suitable electrolyte. One of the problems with the use of carbon as an electrically conductive filler or additive is that upon charge and discharge of the constructed cell, the carbon particles tend to agglomerate and to drift which reduces their electric conductive characteristics resulting in a degradation of cell performance.

Therefore, in view of these shortcomings in the prior art methods and cell produced thereby, it is an object of the present invention to provide a method of preparing an electrochemical cell with improved electrically conductive fillers therein and to provide an improved electrode structure produced thereby and to provide a new composition of matter.

SUMMARY OF THE INVENTION

In accordance with the present invention, an improved electrode is provided for use in an electrochemical cell. The electrode includes an internal current collector of carbon in the form of graphite flakes uniformly distributed therethrough as a result of the conversion of gray cast iron to iron sulfide.

An important object of the invention is to provide a discharged positive electrode comprising an electrically conducted current collector in electrical contact with a particulate mixture of gray cast iron and an alkali metal sulfide and an electrolyte including alkali metal halides or alkaline earth metal halides.

Another object of the invention is to provide a partially charged positive electrode comprising an electrically conductive current collector in electrical contact with a mixture of gray cast iron and the sulfide of a transition metal and an alkali metal sulfide and an electrolyte including alkali metal halides or akaline earth metal halides or mixtures thereof and graphite flakes uniformly distributed through said mixture as residue from the conversion of gray cast iron to iron sulfide.

Yet another object of the invention is to provide a fully charged positive electrode comprising an electrically conductive current collector in electrical contact with a mixture of a transition metal sulfide and gray cast iron powder and an electrolyte including alkali metal halides, or alkaline earth metal halides or mixtures thereof.

A further object of the invention is to provide a method of uniformly distributing carbon or graphite flakes in a mixture of gray cast iron and an alkali metal sulfide comprising reacting the alkali metal sulfide and the gray cast iron to produce iron sulfide and carbon flakes.

A still further object of the invention is to provide a method for uniformly distributing carbon in electrodes comprising forming a mixture including an alkali metal sulfide and gray cast iron and an electrolyte including alkali metal halides or alkaline earth metal halides, assembling said mixture in a first electrode structure, forming an electrochemical cell of the first electrode structure and an electrolyte of alkali metal halides or alkaline earth metal halides and a second electrode containing a material capable of alloying with alkali metal ions and connecting the cell to a source of electrical potential to electrochemically convert gray cast iron into an iron sulfide and uniformly to distribute carbon flakes formerly in the gray cast iron throughout the first electrode while forming an alkali metal alloy in the second electrode.

Yet another object of the invention is to provide a composition including a binder having distributed therein a particulate mixture of gray cast iron and an alkali metal sulfide.

A still further object of the invention is to provide a composition including a binder having distributed therein a mixture of gray cast iron and a transition metal sulfide and an alkali metal sulfide and carbon flakes.

A final object of the invention is to provide a composition including a binder having distributed therein a particulate mixture of gray cast iron and a transition metal sulfide.

These and other objects of the present invention together with further advantages thereof may be more readily understood by reference to the following detailed description of the invention.

DETAILED DESCRIPTION OF THE INVENTION

In the practice of the present invention, various cells and electrode designs may be used with the improved positive electrode composition disclosed herein. In preparing the positive electrode, the electrode material may be in its uncharged or discharged state, in its fully charged state or intermediate state. A principal reason for assembling the positive electrode in the uncharged state is economics. For example, the cost of lithium sulfide used to assemble an uncharged or discharged electrode is significantly less than the cost of pure lithium metal necessary for assembling a fully charged electrode. Clearly, the cost of assembling a partially charged electrode will lie somewhere between the cost of an uncharged electrode and the cost of a fully charged electrode.

Although the invention herein described is applicable to any secondary cell wherein the positive electrode contains an alkali metal sulfide and a transition metal selected from iron, nickel, copper, cobalt and others including molybdenum, and the negative electrode includes any electrochemically suitable material which is capable of alloying with the alkali metal in the positive electrode, for instance aluminum, the cells will be described using lithium and iron in the positive electrode and aluminum in the negative electrode.

In preparing the positive electrode, the electrode material preferentially is selected in its uncharged state. For example, in a lithium-aluminum-iron system, the electrode materials to be included in the positive electrode in the uncharged or discharged state are iron and lithium sulfide.

As before stated, it has long been known that the addition of carbon to the positive electrode is beneficial for the electrical properties of the cell. Carbon traditionally is added either as lithium carbide or as some other form of carbon, the addition of which requires mechanical mixing. During cell operation, the continuing cell charge and discharge cycle results in agglomeration of the carbon particles, thereby decreasing the surface area of the carbon and the current collecting properties thereof.

It has now been found that formulating the positive electrode active material from gray cast iron rather than from the traditionally used pure iron results in a carbon addition in the form of carbon or graphite flakes which upon repeated charge and discharge of the cell does not agglomerate or in any other way coalesce. Rather, the carbon or graphite flakes resulting from the chemical conversion of gray cast iron to the iron sulfide remain uniformly disbursed throughout the positive electrode material and also retain, no matter how many cycles the battery or cell has operated, their full current collecting characteristics.

Gray cast iron as opposed to white cast iron is required. Gray cast iron as defined in the 1948 addition of the ASM Metals Handbook includes carbon in the range of from about 2.7 percent to about 3.6 percent by weight and silicon in the range of from about 1.0 percent by weight to about 2.75 percent by weight. The carbon-iron system in gray cast iron is unique because the carbon exists as discrete graphite flakes. On the otherhand, white cast iron has carbon present but it is chemically tied up as cementite which when substituted in the positive electrode of the type hereinafter described does not provide the improved current collecting characteristics provided by gray cast iron.

In one manner of preparing the improved composition, the positive electrode material along with the electrolytic salt is provided in powder or particulate form. These materials are blended into a solid mixture at a temperature below the melting point of the salt. The amount of the electrolyte can vary in the range of between about 20 percent by weight to about 35 percent by weight, preferably in the range of from about 25 percent by weight to about 30 percent by weight of the total mixture. An amount less than about 20 percent by weight tends to produce a fragile plaque while amounts in excess of about 35 percent by weight may be lost during hot pressing.

Electrolytes which are useful in the present invention are those which are well known in the art and include various combinations of alkali metal halides or alkaline earth metal halides or combinations or mixtures thereof. A particularly widely used electrolyte is the eutetic mixture of lithium chloride and potassium chloride.

In these cells, gray cast iron is present in the range of from about 2 percent by weight to about 25 percent by weight of the electrode active materials in the positive electrode. Preferably, the gray cast iron is present in the range of from about 10 percent by weight to about 20 percent by weight.

Several cells were fabricated using the geometry and the same methods of fabrication to generate comparative data. Some cells were fabricated using gray cast iron with a carbon content as close to 3.6 percent as possible. Other cells were fabricated using the traditional, relatively pure iron powder obtainable from many sources. All cells fabricated had theoretical capacities of 50 and 60 Amp-hours for the positive and negative electrodes, respectively. In the cells which used gray cast iron as the source of iron there was an additional 1.9 percent by weight carbon present in the positive materials as graphite flakes. The cells were operated for periods up to five months for as many as 277 cycles, at a temperature of 450° C. and a current density of 50 mA/cm$^2$. The cells maintained 99+ percent coulombic efficiency throughout their operation; however, the cells with the cast iron additive showed significantly greater utilization of the positive electrode active material. The improvements were generally in the range of up to 13 percent increase in cell performance, all as more clearly illustrated by reference to the data presented in Table I.

TABLE I

| Cell Designation | 3C-13 | 3C-15 | 3C-12 | 3c-16 | 3C-14 |
|---|---|---|---|---|---|
| Assembled State of Charge[a] | U | S | U | U | S |
| Type of Iron Powder | Cast | Pure | Cast | Cast | Pure |
| Sieve Size for Powder | 150-200 | 150-200 | 150-200 | 150-200 | 150-200 |
| Positive Electrode Collector | 10-20 | 10-20 | 5-0 | 5-0 | 5-0 |
| Chg/Dchg Cut-off Voltages(v) | 1.65/1.0 | 1.65/1.0 | 1.65/1.00 | 1.65/1.00 | 1.65/1.00 |
| Test Temperature (°C. ± 5° C.) | 450 | 450 | 450 | 450 | 450 |
| Current Density (mA/cm$^2$) | 50 | 50 | 50 | 50 | 50 |
| Cycle Nos. at 50 mA/cm$^2$ | 5-167 | 7-277 | 5-52 | 5-179 | 5-259 |
| Days of Operation | 90 | 154 | 31 | 92 | 150 |
| Mean Utilization at 50 mA/cm$^2$ | 45.6 | 40.8 | 44.9 | 44.3 | 41.2 |
| Ah Efficiency at Termination | 99.3 | 99.8 | 25.1 | 99.3 | 99.8 |

[a]U-uncharged; S-semicharged

As seen from Table I, the electrodes constructed from gray cast iron had significantly higher mean utilizations at 50 m Amp per square centimeter. The gray cast iron powder was obtained from the Connelley-GPM Inc., and the iron powder used was a commercially pure 99+ percent iron. The current collectors of well known design were fabricated from Argonne iron-base alloys, with the 10-20 alloy containing 10 percent molybdenum and 20 percent nickel. The 5-0 alloy contained 5 percent molybdenum, the balance being iron. In all cases, the cells were initially cycled at 20 mA/- square centimeter for the first 4 to 6 cycles.

Cell 3C-12 was the only cell that failed to complete the planned period of operation. Over the first 44 cycles the coulombic efficiency was very stable at 99+ percent. Thereafter, a ground loop developed within the furnace well and a one day period of unregulated operation occurred. After the ground loop was remedied, a severe short circuit was discovered and post test examination showed that the short circuit was due to high concentration of metallic particles throughout the separator. The particulate material was traced to a severe attack of the stainless steel retaining screens and the collector and frames which had average corrosion rates of 670 and 350 μm/per year, respectively. These corrosion rates were significantly different from the less than 15 μm/per year rates found for the remainder of the cells tested. This severe attack apparently resulted from the period of unregulated cell operation.

Cells 3C-12, 3C-13 and 3C-16 were assembled in the uncharged (discharged) state while the remaining cells, these being 3C-14 and 3C-15 were assembled in the semi-charged state. In the semi-charged state the positive electrode contains both gray cast iron as well as iron sulfide and lithium sulfide, whereas in the discharged or uncharged state the positive electrode contains only gray cast iron and lithium sulfide. In both cases, electrolyte was used as a binder for the cast iron powder and the lithium sulfide on the one hand and the mixture of cast iron powder, iron sulfide and lithium sulfide on the other hand. Preferably, the particulate material used to assemble these electrodes is of a size to pass through 150 mesh screen and be retained on a 200 mesh screen. The use of these fine particles is preferred in order to reduce the corrosive attack on structural components during cell cycling.

Table II is a performance summary for the tested cells reported in Table I. As may be seen, cells 3C-14 and 3C-15 were operated for almost five months while cells 3C-13 and 3C-16 were operated for approximatey three months. Cell 3C-12 which operated for only one month was terminated due to the previously discussed short circuit. In all cases, when gray cast iron was used in the positive electrode, the mean utilization was significantly greater than in cases without it.

TABLE II

| Cell | Test Components | Assembled | Days | Cycles | Mean % Utilization* | Final A.h Efficiency |
|---|---|---|---|---|---|---|
| 3C-12 | ANL-5-0 | uncharged | 31 | 52 | 44.9 | 25.1 |
| 3C-13 | ANL-10-20 | uncharged | 90 | 167 | 45.6 | 99.3 |
| 3C-14 | ANL-5-0 | semicharged | 150 | 259 | 41.2 | 99.8 |
| 3C-15 | ANL-10-20 | semicharged | 154 | 277 | 40.8 | 99.8 |
| 3C-16 | ANL-5-0 | uncharged | 92 | 179 | 44.3 | 99.3 |

*Based on a discharge rate of 50 mA/cm$^2$

To construct a fully charged positive electrode, the positive electrode mixture is an iron sulfide and gray cast iron powder and an electrolyte. This is different than the semi or partially charged electrode which consists of particulate gray cast iron and iron sulfide and an alkali metal sulfide such as lithium sulfide all mixed with an electrolyte. A partially charged or fully charged electrode if constructed of iron sulfide which was converted from gray cast iron powder will have distributed through it graphite or carbon flakes. Accordingly, a partially charged or fully charged positive electrode may or may not have graphite flakes uniformly distributed through the electrode material depending on whether the iron sulfide present in the electrode was produced from a gray cast iron. Finally, a fully discharged positive electrode will contain a particulate mixture of gray cast iron and an alkali metal sulfide such as lithium sulfide all mixed with the electrolyte.

Another aspect of this invention particularly with respect to secondary electrochemical batteries is a method of uniformly distributing carbon as graphite flakes in positive electrodes. After the positive electrode is formulated as hereinbefore described, a negative electrode including aluminum or other material capable of alloying with the alkali metal values in the positive electrode is formed into an electrochemical cell and connected to a source of electrical potential. The gray cast iron present in the positive electrode is then electrochemically converted to an iron sulfide with the resultant uniform distribution throughout the positive electrode of carbon or grahite flakes while simultaneously an alkali metal alloy is formed in the negative electrode, for instance a lithium-aluminum alloy. During continued operation of the cell, as illustrated in Table II wherein some cells were operated in excess of five months, the graphite flakes do not agglomerate or clump together thereby reducing their current collecting capabilities. Rather, the graphite flakes remain uniformly distributed throughout the positive electrode material functioning to provide improved efficiency and utilization of the positive electrode material.

The method above described is not limited to a battery but is effective to distribute carbon or graphite flakes in any mixture containing gray cast iron. For instance, a mixture of gray cast iron powder and lithium sulfide may be compacted and elevated to a temperature in the range of from about 350° C. to about 700° C. thereby resulting in the conversion of some of the gray cast iron to iron sulfide with the resultant dispersion of carbon or graphite flakes throughout the particulate mixture. In this manner, an electrochemical conversion of the gray cast iron to iron sulfide is not required in order uniformly to distribute the graphite flakes throughout the mixture.

Some electrodes are constructed wherein an electrolyte is not used as the binder for maintaining together the electrode active materials. In some cases, a synthetic organic resin is used as a binder to retain the electrode active materials in the required proximity. The invention contemplates compositions including electrode active materials maintained together by suitable binders such as various organic resins well known in the art as well as other additives such as pore formers and the like. For instance, a composition useful for preparing a fully discharged electrode includes a suitable binder having distributed therein particles of gray cast iron and an alkali metal sulfide such as lithium sulfide. Similarly, a composition useful for preparing a semi-charged or partially discharged electrode includes a suitable binder having distributed therein a particulate mixture of gray cast iron, any suitable transition metal sulfide such as iron sulfide, an alkali metal sulfide such as lithium sulfide and perhaps carbon or graphite flakes, this depending on whether the transition metal sulfide is an iron sulfide and whether the iron sulfide present was produced from a gray cast iron. A composition useful in preparing a fully charged positive electrode includes a suitable binder of the type hereinbefore described containing or having admixed therewith a particulate mixture of gray cast iron and a suitable transition metal sulfide.

While there has been described what at present is considered to be the preferred embodiment of the present invention, it will be understood that various modifications and alterations may be made therein without departing from the true scope of the present invention, and it is intended to cover by the claims appended hereto all such variations and modifications.

We claim:

1. A discharged positive electrode comprising an electrically conductive current collector in electrical contact with a particulate mixture of gray cast iron and an alkali metal sulfide and an electrolyte including alkali metal halides or alkaline earth metal halides.

2. The discharged positive electrode of claim 1, wherein said gray cast iron has a carbon content of about 3.6 percent by weight.

3. The discharged positive electrode of claim 1, wherein said alkali metal sulfide is lithium sulfide.

4. The discharged positive electrode of claim 1, wherein said electrolyte is a mixture of alkali metal halides.

5. The discharged positive electrode of claim 4, wherein said electrolyte contains lithium chloride and the alkali metal sulfide is lithium sulfide.

6. The discharged positive electrode of claim 1, wherein substantially all of the gray cast iron is of a size to pass through a 150 mesh screen.

7. A partially charged positive electrode comprising an electrically conductive current collector in electrical contact with a mixture of gray cast iron and a transition metal sulfide and an alkali metal sulfide and an electrolyte including alkali metal halides or alkaline earth metal halides and carbon flakes uniformly distributed throughout said mixture as residue from the conversion of gray cast iron to iron sulfide.

8. The partially charged positive electrode of claim 7, wherein said gray cast iron has a carbon content of about 3.6 percent by weight.

9. The partially charged positive electrode of claim 7, wherein said alkali metal sulfide is lithium sulfide and said electrolyte contains lithium chloride.

10. The partially charged positive electrode of claim 7, wherein said transition metal sulfide is selected from the sulfides of iron, nickel, cobalt, copper or mixtures thereof.

11. The partially charged positive electrode of claim 7, wherein said alkali metal sulfide is lithium sulfide and said transition metal sulfide is iron sulfide.

12. The partially charged positive electrode of claim 7, wherein substantially all of said gray cast iron is of a size to pass through a 150 mesh screen.

13. A fully charged positive electrode comprising an electrically conductive current collector in electrical contact with a mixture of a transition metal sulfide and gray cast iron powder and an electrolyte including alkali metal halides or alkaline earth metal halides.

14. The fully charged positive electrode of claim 13, wherein the gray cast iron is present in the range of from about 2 percent by weight to about 25 percent by weight of the transition metal.

15. The fully charged positive electrode of claim 13, wherein said gray cast iron is present in the range of from about 10 percent by weight to about 20 percent by weight of the transition metal sulfide.

16. The fully charged positive electrode of claim 13, wherein the electrolyte contains lithium chloride and said transition metal sulfide is iron sulfide.

17. A method of uniformly distributing carbon flakes in a mixture of gray cast iron and an alkali metal sulfide comprising reacting the alkali metal sulfide and the gray cast iron to produce iron sulfide and carbon flakes.

18. The method of claim 17, wherein the alkali metal sulfide and the gray cast iron are reacted by heating the gray cast iron and the alkali metal sulfide to a temperature in the range of from about 350° C. to about 700° C.

19. The method of claim 17, wherein the gray cast iron and the alkali metal sulfide are present in particulate form in an electrolyte containing alkali metal halides, the mixture of the gray iron particles and the alkali metal sulfide and the electrolyte being heated to a temperature in the range of from about 350° C. to about 700° C.

20. The method of claim 17, wherein the gray cast iron has a carbon content of about 3.6 percent by weight.

21. A method of uniformly distributing carbon in electrodes comprising forming a mixture including an alkali metal sulfide and gray cast iron and an electrolyte of alkali metal halides or alkaline earth metal halides, assembling said mixture in a first electrode structure, forming an electrochemical cell of said first electrode structure and an electrolyte of alkali metal halides or alkaline earth metal halides and a second electrode containing a material capable of alloying with alkali metal ions, and connecting said cell to a source of electrical potential to electrochemically convert gray cast iron to an iron sulfide and uniformly to distribute carbon flakes formerly in said gray cast iron throughout said first electrode while forming an alkali metal alloy in said second electrode.

22. The method of claim 21, wherein the first electrode structure contains a particulate mixture of lithium sulfide and gray cast iron and the electrolyte contains lithium chloride.

23. The method of claim 21, wherein the second electrode contains aluminum.

24. A composition including a binder having distributed therein a particulate mixture of gray cast iron and an alkali metal sulfide.

25. The composition of claim 24, wherein the binder is an electrolyte containing alkali metal halides or alkaline earth metal halides.

26. The composition of claim 24, wherein the gray cast iron has a carbon content of about 3.6 percent by weight.

27. The composition of claim 24, wherein the alkali metal sulfide is lithium sulfide.

28. The composition of claim 27, wherein the binder contains lithium chloride.

29. A composition including a binder having distributed therein a mixture of gray cast iron, a transition metal sulfide, an alkali metal sulfide and carbon flakes.

30. The composition of claim 29, wherein the gray cast iron is present in the range of from about 2 percent by weight to about 25 percent by weight of the transition metal sulfide.

31. The composition of claim 29, wherein the gray cast iron is present in the range of from about 10 percent to about 20 percent by weight of the transition metal sulfide.

32. The composition of claim 29, wherein the gray cast iron has carbon present in an amount of about 3.6 percent by weight.

33. The composition of claim 29, wherein the transition metal sulfide is selected from the sulfides of iron, nickel, cobalt, copper or mixtures thereof.

34. The composition of claim 29, wherein the alkali metal sulfide is lithium sulfide and said transition metal sulfide is iron sulfide.

35. A composition including a binder having distributed therein a particulate mixture of gray cast iron and a transition metal sulfide.

36. The composition of claim 35, wherein the gray cast iron is present in the range of from about 2 percent by weight to about 25 percent by weight of the transition metal sulfide.

37. The composition of claim 35, wherein the gray cast iron is present in the range of from about 10 percent by weight to about 20 percent by weight of the transition metal sulfide.

38. The composition of claim 35, wherein the binder is an electrolyte containing alkali metal halides or alkaline earth metal halides.

39. The composition of claim 35, wherein the binder includes lithium chloride.

40. The composition of claim 35 wherein the transition metal sulfide is selected from the sulfides of iron, nickel, cobalt, copper or mixtures thereof.

* * * * *